United States Patent [19]

Ogawa et al.

[11] 4,273,983
[45] Jun. 16, 1981

[54] METHOD OF RESISTANCE WELDING

[75] Inventors: Masahiro Ogawa, Toyoake; Tugio Mizobe, Toyota, both of Japan

[73] Assignee: Toyota Jidosha Kogyo Kabushiki Kaisha, Toyota, Japan

[21] Appl. No.: 58,172

[22] Filed: Jul. 17, 1979

Related U.S. Application Data

[63] Continuation-in-part of Ser. No. 850,192, Nov. 10, 1977, abandoned, which is a continuation of Ser. No. 715,876, Aug. 19, 1976, abandoned, which is a continuation-in-part of Ser. No. 486,872, Jul. 9, 1974, abandoned.

[30] Foreign Application Priority Data

Jul. 14, 1973 [JP] Japan .................................. 48-78909

[51] Int. Cl.³ .......................................... B23K 11/20
[52] U.S. Cl. ...................................... 219/93; 219/107; 219/118; 428/583; 428/934
[58] Field of Search ................ 219/93, 101, 104, 107, 219/118; 428/583, 934, 653, 660, 677, 684

[56] References Cited

U.S. PATENT DOCUMENTS

| | | | |
|---|---|---|---|
| 651,597 | 6/1900 | Eyre | 219/104 |
| 910,434 | 1/1909 | Thompson | 219/118 |
| 2,127,685 | 8/1938 | Greulich | 219/93 X |
| 3,089,021 | 5/1963 | Hawes | 219/104 |
| 3,435,183 | 3/1969 | Vagi | 219/118 X |
| 3,436,806 | 4/1969 | Supan | 428/653 X |
| 3,476,905 | 11/1969 | Larsen | 219/93 |
| 3,598,952 | 8/1971 | Roberson | 219/107 |
| 3,760,143 | 9/1973 | Rondeau | 428/684 X |
| 3,816,701 | 6/1974 | Stormer | 219/107 X |

Primary Examiner—Richard R. Kucia
Attorney, Agent, or Firm—Kenyon & Kenyon

[57] ABSTRACT

An improved method for resistance welding two metallic articles, made of dissimilar metals which form brittle intermetallic compounds when melted together. A first one of the metallic articles is provided with a tapered, flat-topped projection which is pressed against the other metallic article. The first article preferably is composed of the metal most difficult to melt, as determined by the four parameters of melting point, electrical resistance, heat conductivity and specific heat. The projection is formed with a predetermined relation between height, top width, and angle of taper such that a preselected extremely high welding current passed for a very short time will establish a maximum temperature near the top of the projection sufficient to melt the contacting surfaces of the two metallic articles and a temperature gradient such that an intermediate portion of the projection becomes markedly plastic while the adjacent base portion of the projection remains undeformable under extremely high welding pressure. Impurities and intermetallic compounds in the molten metal at the top of the projection are squeezed out to the periphery of the surfaces to be welded, and the weld joint is made between plastic but unmelted metal of the projection and the other article.

30 Claims, 11 Drawing Figures (a)

(b)

METHOD OF RESISTANCE WELDING

CROSS-REFERENCE TO RELATED APPLICATIONS

This is a continuation-in-part of application Ser. No. 850,192 filed Nov. 10, 1977, which was a continuation of Ser. No. 715,876 filed Aug. 19, 1976, which was a continuation-in-part of Ser. No. 486,872 filed July 9, 1974, all said prior applications being abandoned.

BACKGROUND OF THE INVENTION

1. Field of the Invention

This invention relates to a method of resistance welding articles made of dissimilar metals, one of which is formed with a projection; more particularly it relates to resistance projection welding of steel with aluminum, steel with cast iron, copper with aluminum and steel with titanium, as well as a weld joint produced by the same method.

2. Description of the Prior Art

Techniques for electrical resistance welding of two metallic articles have been known for many years, including the use of a projection or projections on the surface of one of the articles to be welded (so-called projection welding). The use of such projections permits matching the heat capacities of the two articles, for example, as when welding a relatively thick member to a thin sheet.

Conventional projection welding methods involve either fusion welding or pressure (diffusion) welding. In fusion welding, the metallic materials of the member having the projection and the other member melt, and the final welded joint contains a nugget of such materials that have melted and then resolidified. The high temperature in the melt zone facilitates the formation of a solid solution of foreign materials and oxides that may be present on the metallic surfaces to be joined. Consequently, the fusion welding method does not normally require extensive precleaning of the contacting surfaces. On the other hand, since many dissimilar metals tend to form brittle intermetallic compounds when melted together, which will result in a weak joint, fushion welding is usually restricted to the bonding of articles made of the same metal.

The welding parameters used in conventional fusion welding typically include a moderate welding current applied over a relatively long time duration. For example, fusion welding of steel to steel may involve a welding current density of about 1 KA/mm$^2$ applied over 20 to 30 cycles. (Throughout the Specification and claims, welding times will be expressed in terms of cycles of alternating current, a frequency of 60 Hz being understood.) There are no established standard values for the welding pressures to be used in conventional projection welding. However, conventional welding pressure in general is relatively low. For example, in the related art of spot welding, the RWMA, Class A standard recommends a welding pressure of 14 kg/mm$^2$, for a welding current density of 0.24 KA/mm$^2$ and a current duration of 40 cycles.

In diffusion welding, the two metal articles remain solid and are bonded by applying sufficient pressure at a temperature below their melting points to cause diffusion across the boundary between them. Because welding takes place below the melting temperatures of the metals, any foreign matter on the surfaces will form undissolved inclusions in the welded joint. Also, because diffusion welding takes a relatively long time, intermetallic compounds will tend to form even at the below melting point temperatures used for this method.

Consequently, successful diffusion welding usually requires preliminary chemical purification of the weld surfaces to remove foreign materials and oxides, and it is conducted either under vacuum or in an inert atmosphere to maintain surface purity over the long period required for bonding. Difffusion welding, therefore, finds application only within a limited field of industry and is not well suited to mass production methods.

Thus, resistance welding of dissimilar metals poses great difficulties. On the one hand, the foreign matter and oxides usually present on the surfaces of the metals will not readily go into a solid solution with either of the metals at the relatively low temperatures used for diffusion welding. On the other hand, the formation of brittle intermetallic compounds is accelerated at the higher temperatures used in fushion welding.

The prior art has long recognized that the intermetallic compounds and oxidized surface layers can be physically displaced away from the weld region by exerting high pressure while the metals adjacent to the junction are heated to the plastic state. Under the influence of such pressure exterted normal to the plane of the joint, the plastic metals at the boundary between the articles being welded will be squeezed laterally to the edges of the joint, carrying the extraneous materials with them. The resulting weld bond is thereby formed between unmelted sub-surface portions of the joined articles that have not been exposed to the atmosphere.

For example, U.S. Pat. No. 651,597, issued in 1900 to R. Eyre, discloses a method for butt-welding steel bars by bringing the two pieces in contact with each other and passing a heating current through them. When the central portion has reached the desired temperature, which preferably should not be more than a dull red heat, the joint is upset with sufficient pressure and through a sufficient distance to squeeze substantially all of the metal in the central heated zone to the periphery of the junction. Hence, the actual weld is formed by metal which has never been exposed to the atmosphere.

The Eyre patent emphasizes that there must be a sharp contrast in temperature between the central portion of the weld zone and the adjacent portions; so that the actual union is made between metal of each bar that has been maintained at a relatively low temperature. Eyre teaches the use of a stream of water to cool the regions of the workpieces away from the junction and thereby achieve the desired temperature gradient.

Although simple in concept, this procedure is difficult to control in practice. Relatively small variations in amplitude and duration of welding current and in welding pressure can affect substantially the plasticity of the metals at and near the junction. The problem is compounded when the pieces to be joined are made of dissimilar metals having different melting points, different electrical conductivities, and different specific heats.

One approach to controlling the heat conditions in a weld zone between two dissimilar metals is proposed in U.S. Pat. No. 3,435,183, issued May 19, 1965 to J. J. Vagi. The Vagi patent relates to a method for continuously welding a thin aluminum fin in a helix on a stainless steel tube. The method calls for passing a high frequency welding current between a first electrode contacting the aluminum fin and a second electrode contacting the pipe while the pipe is rotating. The aluminum fin is wound around the periphery as the pipe rotates. The first electrode is spaced a predetermined distance from the initial contact point between the aluminum fin and the pipe, and the second electrode is spaced circumferentially a predetermined distance from the same contact point on the pipe.

The power level of the current is just sufficient to render plastic only the surfaces of the tube and of the aluminum strip adjacent to the juncture between them. Upon application of welding pressure at that juncture, intermetallic compounds and oxidized surfaces formed on the plasticized portions of the tube and strip are displaced from the immediate area of the juncture to bring the plastic unoxidized surfaces of the aluminum and steel into engagement to form a bond.

According to the patent specification, uneven heating due to unavoidable variations in heating effect and parameters of the materials can be controlled by selecting an optimum peripheral velocity and by spacing the first and second electrodes from the weld juncture by a predetermined differential spacing. The method of the Vagi patent for controlling the temperature of the two materials is not suitable, however, for use where the articles to be welded must be clamped in the respective electrodes.

Another approach to controlling conditions in the weld zone, again when welding dissimilar metals, is provided in U.S. Pat. No. 3,089,021, issued May 7, 1963 to D. H. Hawes, et. al. In the method disclosed in the Hawes patent, a relatively low-current arc is formed between two members that are not in contact. This arc is maintained until adjacent first portion of the workpieces are softened and melted, and second portions are plasticized. Only then are the two members brought into contact under great pressure, thereby expelling the molten material from the weld zone as flashing; so as to produce an intimate bond between the heated plastic materials of the second portions.

Thus, the welding method of Hawes provides temperature control by means of the inherent current limiting characteristic of an electric arc. Because of this limitation, which produces current densities of about 12,000 amperes per square inch (or about 0.02 KA/mm$^2$), the arcing time must extend for 10 to 60 seconds in order to produce the desired temperature conditions.

Still another method for controlling the heat in a resistance weld between dissimilar metals is presented in U.S. Pat. No. 910,434, issued on Jan. 19, 1909 to C. E. Thompson. In the Thompson process, metal parts having different electrical conductivities are resistance welded by first proportioning the contacting areas of the two parts inversely to their respective conductivities.

In a specific example, a brass head is welded to a steel bolt, the head having a welding lug of frusto-conical form. Since the conductivity of brass is nearly five times that of steel, the tip of the conical lug is formed with a cross-sectional area approximately one-fifth the area of the steel bolt. The two parts are pressed together under steady pressure as electric current passes through them.

According to the patent specification, the reduced contact area at the tip of the welding lug limits the flow of current so that the rise in temperature of the brass head can be controlled, and the continuous end of the bolt will become plastic before the head becomes so fluid as to run. The brass head closes in as the lug fuses, and by the time that the conical portion has been fused, the steel is brought to the required welding temperature.

The Thompson patent does not specify the use of high pressure to expel the fused material away from the weld juncture. Instead, the patent drawings indicate that a moderate pressure is used, since only a modest bulge is shown at the plane of the weld joint. The specification does mention, however, that filaments or fringes of the respective materials interlock at the weld joint, and the patentee takes this to indicate that the two materials are substantially equally plasticized in spite of their unlike conductivities. Since no values of welding current, welding time, or welding pressure are given, however, this observation cannot be verified.

The prior art of projection welding includes German Auslegeschrift No. 1,067,545, published on Oct. 22, 1959. This German patent discloses a fusion welding process, in which the first half wave of welding current is suppressed with respect to the succeeding half waves, in terms of a current-time-integral. This German patent discloses that a relatively large current density and welding pressure, for example, a current of 35.5 KA and a welding pressure of 320 kg are applied to a projection having a diameter of 3 mm and a height of 0.4 mm. Since the diameter of the projection is larger than the height thereof, it is difficult to produce a weld joint having a high strength from the dissimilar metals mentioned above, namely, steel with aluminum, steel with cast iron, copper with aluminum and steel with titanium.

SUMMARY OF THE INVENTION

It is an object of the present invention to provide an improved method for resistance projection welding of two dissimilar metals to produce a weld joint of superior strength.

Another object of the invention is to provide an inherently stable method for controlling the heat conditions while resistance projection welding two dissimilar metals.

Another object of the invention is to provide a method for resistance projection welding of two dissimilar metals that does not require special purification of the surfaces being welded and is suited to economical high volume production.

Another object of the present invention is to provide a weld joint of dissimilar metals, having superior strength.

These and other objects are achieved in a method for resistance welding two articles made of dissimilar metallic materials that includes the steps of:

(a) forming at least one small, integral, tapered, flat-topped projection on a first article made of one metallic material, the projection having a predetermined height that is divided into a top portion, an intermediate portion, and a base portion and a predetermined width of the flat-topped surface, opposite sides of the projection each making a predetermined angle with the axis of the projection;

(b) placing the top surface of the at least one projection of the first article into conducting contact with the surface of a second article made of another metallic material;

(c) pressing the top surface of the at least one projection of the first member against the surface of the second member with a predetermined high welding pressure exerted in a direction perpendicular to the contacting surfaces;

(d) passing an electric welding current of predetermined high density, based on the total initial top surface area of the at least one projection, across the contact area between the projection of the first article and the second article for a predetermined short time period while maintaining constant the predetermined welding pressure between the two articles.

A weld joint of dissimilar metals produced by a resistance welding according to the present invention comprises:

a first article made of one metallic material having at least one small, integral, tapered, flat top projection, which has a predetermined height that is divided into a top portion, an intermediate portion, and a base portion and a predetermined width of the flat-topped surface, opposite sides of the projection each making a predetermined angle with the axis of the projection, and said bottom portion being essentially not deformed;

a second article made of another metallic material being welded to said, first article through said projection;

the welded surfaces of said first and second articles, including no nugget, and the welded surface of the projection being radially spread in a plastic flow, and;

a molten metal, which is melted due to the passage of electric current across the contact area between the projection of the first article and the second article, and which metal is squeezed along the contact area and solidified at the periphery of the welded surfaces.

The at least one projection is preferably in the form of a tapered rib, the length of the rib being such that the total top surface area of the at least one rib is approximately equal to the desired area of the welded joint. Preferably the predetermined height of the rib is on the order of 2 mm, and the predetermined width at the top of the rib is on the order of one-half millimeter. The predetermined angle made by the sides of the rib or projection falls within a range between a minimum angle sufficient to prevent the rib from buckling during the welding process and a maximum angle such that the weld strength does not fall below a desired value.

The predetermined electric welding current density and the welding time are adjusted to produce a temperature gradient in the projection such that the contacting surfaces of the two metallic articles are melted, the temperature in the intermediate portion of the projection is such that said intermediate portion is rendered plastically flowable under the applied pressure, and the temperature in the base portion remains below the minimum temperature at which the metal of the projection will plastically flow.

The predetermined welding pressure is adjusted to a high value such that the melted top portion of the projection and the abutting melted surface portion of the second article are squeezed laterally away from the contact area by the plastic flow of the metal in the intermediate portion of said projection, thereby producing a welded joint in which only atmospherically unexposed, unmelted metal of the first article is in direct bonding contact with atmospherically unexposed, unmelted metal of the second article, and the atmospherically exposed metal of both articles is incorporated in metal flash at the periphery of the joint.

Preferably, the welding pressure should be adjusted to the highest value possible without causing buckling or plastic deformation of the projection prior to passage of the welding current, since it has been determined that the strength of the welded joint between two dissimilar metals increases approximately linearly with increasing welding pressure.

The significant distinguishing characteristics of the resistance projection welding method of the present invention over the previously-described prior art methods are:

(a) the temperature in the projection produces melting only of the top region of the projection in its original form (i.e., before passage of the welding current);

(b) the projection has such a shape that it radially spreads in a plastic flow;

(c) high welding pressures are used, and;

(d) high welding currents and correspondingly shorter welding times are used.

These characteristics provide several advantages, both over previous methods in which the metals to be welded are heated only to the plastic state and to methods in which the projection is completely fused (e.g., the Thompson U.S. Pat. No. 910,434).

When the contacting surfaces of the two members are melted, rather than merely being rendered plastic, the oxides and other materials remaining on these surfaces will dissolve in the melted metals. This assures more complete removal of these undesirable elements away from the weld junction.

An even more important advantage to heating the weld junction to the melting point is that the latent heat of fusion provides an inherently stabilizing effect in the event of uncontrollable fluctuations of the welding parameters. Since the latent heat of fusion is much larger than the specific heat of the metallic material, relatively large fluctuations in welding current, for example, will be absorbed by small incremental changes in the volume of melted metal at the weld interface, without significantly affecting the temperature gradient in the rest of the projection. On the other hand, fluctuations of the same magnitude could substantially change the temperature, and consequently the plasticity, of the metals in the weld zone if no melting is allowed to take place.

At the same time, the method of the present invention does not create appreciably greater amounts of brittle intermetallic compounds, even though melting tends to increase the formation of such compounds. The creation of intermetallic compounds also is influenced by the duration of welding current, as well as by the maximum temperature reached. The present method uses shorter welding times (as well as higher currents) than the prior art to achieve equal or improved weld strength. Thus, any tendency to increase the formation of intermetallic compounds, caused by melting at the interface, will be offset by the shorter duration of welding current. It is clear, therefore, that the method of the present invention does not significantly increase the formation of intermetallic compounds in the weld joint.

On the other hand, the present invention presents advantages over the previously-discussed method in the Thompson patent in which the entire projection is fused. Melting only the top portion of the projection assures minimum formation of intermetallic compounds because of the correspondingly very short welding time. This limitation also assures that there will be an intermediate plastic portion of the projection available to provide the squeezing action that radially spreads and expels the melted top portion to the edges of the weld junction. Furthermore, such limited welding time assures that sufficient unplasticized metal will remain in the bottom portion of the projection to retain the tapered shape that is necessary to produce the desired temperature gradient and to assure there will be no buckling of the projection. It is, therefore, possible to obtain welded surfaces having no intermetallic compound of the dissimilar metals remaining at the welded surfaces.

The welded structure fabricated by the method of our invention has the following features. Firstly, it does not include in a welded article any nugget, which is usually formed in the conventional resistance welding process, by solidification of the molten metal.

Secondly, the molten metal solidifies at the periphery of the welded surfaces, where the stresses in the cooling period are minimized. As is described above, the molten metal is squeezed toward the fin, therefore the molten metal does not solidify at the welding surfaces.

Thirdly, the welded structure possesses a high welded strength, because the generally brittle intermetallic compound formed in the melt does not remain at the welded surfaces.

Experimental testing of specified pairs of dissimilar metals has provided preferred ranges for the height h, the top width w, and angle $\alpha$ of the projection, as well as the welding current density I, the welding pressure P, and the welding time t, as follows:

1. aluminum with steel: h=approximately 2 mm, $\alpha=12°$ to 30°, I=1.5 to 2.6 KA/mm$^2$, and most preferably=1.8 to 2.3 KA/mm$^2$, P=30 to 100 kg/mm$^2$, and most preferably 48 to 83 kg/mm$^2$, and t=0.5 to 10 cycles;

2. cast iron with steel: h=approximately 2 mm, $\alpha=12°$ to 35°, I=0.75 to 2 KA/mm$^2$, and most preferably 1.10 to 1.65 KA/mm$^2$, P=15 to 90 kg/mm$^2$, and most preferably 34 to 71 kg/mm$^2$, and t=0.5 to 10 cycles;

3. aluminum with copper: h=approximately 2 mm, $\alpha=12°$ to 30°, I=2.9 to 3.4 KA/mm$^2$, and most preferably 3.0 to 3.3 KA/mm$^2$, P=20 to 50 kg/mm$^2$, and most preferably 28 to 32 kg/mm$^2$, and t=0.5 to 3 cycles;

4. copper with steel: h=approximately 2 mm, $\alpha=15°$ to 25°, I=2.3 to 2.9 KA/mm$^2$, and most preferably 2.5 to 2.7 KA/mm$^2$, P=20 to 80 kg/mm$^2$, and most preferably 35 to 65 kg/mm$^2$, and t=1 to 5 cycles;

5. steel with titanium: h=approximately 2 mm, $\alpha=7°$ to 25°, I=1.4 to 2.0 KA/mm$^2$, and most preferably 1.6 to 1.8 KA/mm$^2$, P=30 to 100 kg/mm$^2$, and most preferably 48 to 83 kg/mm$^2$, and t=0.5 to 3 cycles.

In each of the above combinations of metals, the projection was formed on the metal that is the more difficult to melt when an electrical current is passed through it, taking into account not only the melting point of each metal but also its electrical resistance, heat conductivity, and specific heat. It has been found that by choosing the most difficult to melt of the two articles for having the projection results in superior strength of the welded joint.

The invention will next be explained in detail by way of illustrative examples with reference to the accompanying drawings.

DESCRIPTION OF THE PREFERRED EMBODIMENTS

Figure 1:
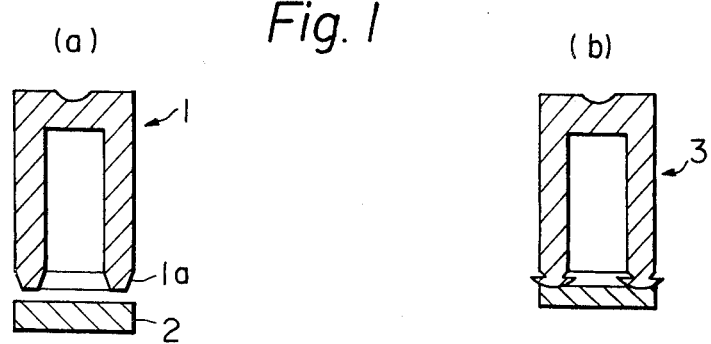
FIGS. 1 through 3 show longitudinal cross sections of several internal combustion engine components which can be fabricated by the method of the present invention.
Figure 2:
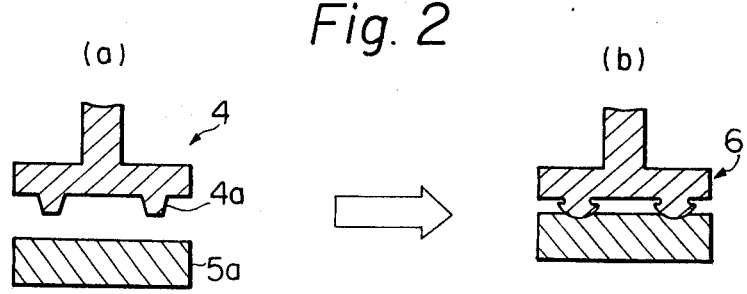
Figure 3:
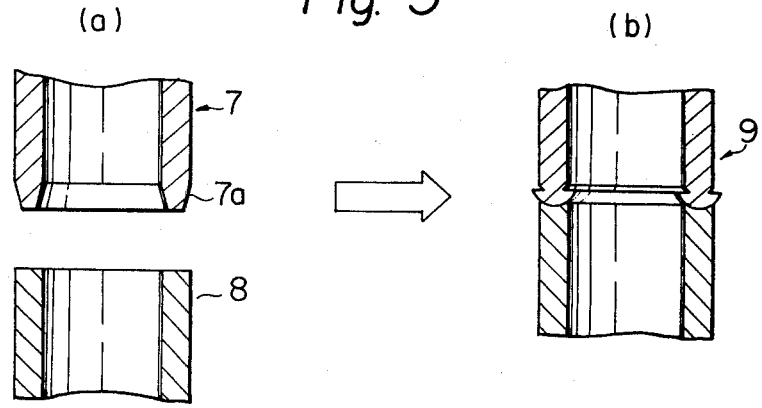

Specific applications of the welding process according to the present invention include the welding of various parts of an automobile engine, as illustrated in FIGS. 1 through 3. For example, FIG. 1 shows a hollow cylindrical body 1, closed at one end and provided with an annular tapered rib-like projection 1a at the other end. The projection can be welded to a circular disc 2 of a different metal to produce a valve lifter 3.

In FIG. 2, a T-bar 4 is provided with two parallel rib-like projections 4a running along the cross-plate of the T. The projections of T-bar 4 can be welded to a flat plate 5 made of a dissimilar metal to produce a valve rocker arm 6.

As shown in FIG. 3, one end of a tube 7 is chamfered to provide an annular rib-like projection 7a. This projection is then butt-welded to the squared end of a second tube 8 to produce a part of a valve 9.

Figure 4:
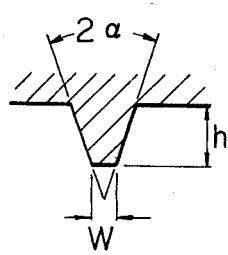
FIG. 4 shows the cross-sectional form of the projection employed in the present invention.

Each of the foregoing embodiments permits mass production of components fabricated from two members made of dissimilar metals, in which each metal is selected for optimum properties in relation to the function of the completed component. For example, the metal of one of the members could be selected for high strength, while the metal of the other member could be selected for superior wear resistance. In each case, the projection cross section is trapezoidal, preferably an isosceles trapezoid as shown in FIG. 4, where the projection has a height h, a top width w, and the sides form an included angle $\alpha$.

In describing the dimensions of the projection, the terms top surface and top width will be used to refer to the outer face of the trapezoidal section, regardless of the orientation of the projection (i.e., whether facing up, down, etc.).

The proper choice of dimensions of the projection can be made for any two dissimilar metals either experimentally or by use of well-known mathematical solutions for temperature distribution in trapezoidal ribs. In either case, the criteria for selection are (1) achievement of melting of the contacting surfaces of the projection and the other article and (2) creation of a continuously decreasing temperature in the projection such that the intermediate portion of the projection reaches a temperature at which the metal will plastically, radially flow under the preselected welded pressure but does not melt, and the base portion of the projection remains below such a temperature.

The following six examples provide selected illustrations of results obtained from experimental tests to determine the ranges of welding parameters for various selected combinations of metallic materials.

Examples 1–3 give results of tests in which one or more of the parameters is varied from minimum to maximum values that will produce satisfactory weld strength.

Examples 3–6 provide typical values of welding parameters for various other combinations of metals and for different shapes of the two members to be welded.

The dimensions of the two members of each example, the materials from which they are made, and the welding parameters are set out in Table 1. In each case the dimensions are given in millimeters, and the projection angle α is given in degrees. The welding parameters are current density I, welding strength P, and welding time t. Current density I is expressed in KA/mm$^2$, in which the area corresponds to the total top surface area of the projection or projections as formed on the first metallic article and prior to passing the welding current. Welding pressure is expressed in kg/mm$^2$, where the area of measurement is the same as that used for current density. Welding time is given in terms of cycles at a standard frequency of 60 Hz.

Figure 5:
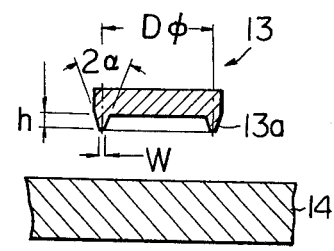
FIG. 5 is a cross-sectional view of the workpieces employed in Examples 1–5.

The shape of the test workpieces used in Examples 1–5 is shown in FIG. 5. The first metallic article in each case is a disc 13 having a circumferential projection 13a extending from one face of the disc around the complete periphery. The second metallic article 14 is a square metal plate, in the case of Examples 1–3, or a metal disc, in the case of Example 5. In Example 6, the first metallic article is in the same form as in Examples 1–5 (i.e., a disc with a circumferential projection extending from one face), but the second metallic article is a tube. The projection of Example 6 is welded to the end of the tube as in FIG. 3.

EXAMPLE 1

In this Example a first metallic article of case hardening steel was provided with an isosceles trapezoidal projection. The top surface of the projection was pressed against one face of a second metallic article in the form of a square plate. Welding was carried out at two different current densities I for a number of test pieces having different projection angles α ranging from 10° to 45° (see Table 1).

TABLE 1

| Example | First Metallic Article (Disc) | | | | | Second Metallic Article | | | | Welding Parameters | | | |
|---|---|---|---|---|---|---|---|---|---|---|---|---|---|
| | Kind of Material | Projection | | | | Kind of Material and Shape | Dimensions | | | I (KA/mm$^2$) | P (KA/mm$^2$) | t (cycles) | FIGS. |
| | | d (mm) | h (mm) | w (mm) | (°) | | l (mm) | w (mm) | h (mm) | | | | |
| 1 | Case-hardening Steel JIS - sCr 15 (AISI 5115) | 30 | 2 | 0.5 | 10–45 | Aluminum Plate JIS - AC4C (ASM - 43) | 50 | 50 | 10 | 1.5–1.7 | 47 | 3 | 6–8 |
| 2 | Carbon Steel JIS - S 15 C (AISI 1015) | 22 | 2 | 0.5 | 20 | Aluminum Plate JIS - AC4C (ASM - 43) | 50 | 50 | 10 | 1.7 | 10–100 | 2 | 9 |
| 3 | Carbon Steel JIS - S 15 C (AISI 1015) | 30 | 2 | 0.7 | 30 | Grey Cast Iron JIS - FC 20 ASTM A48-64, #30B) | 50 | 50 | 10 | 0.5–1.1 | 23 | 00–20 | 10,11 |
| | | | | | | | d (mm) | | h (mm) | | | | |
| 4 | Copper JIS - CuPl (ASM - ETP) | 22 | 2 | 0.5 | 20 | Aluminum Disc JIS - AlPl (ASM - 1050) | 50 | | 10 | 3.1 | 35 | 1 | |
| 5 | Carbon Steel JIS - S 15 C (AISI 1015) | 22 | 2 | 0.5 | 20 | Titanium Disc (Commercially Pure) | 50 | | 10 | 1.8 | 67 | ½ | |
| | | | | | | | i.d. | | o.d. | | | | |
| 6 | Carbon Steel JIS - S 15 C (AISI 1015) | 22 | 2 | 0.5 | 20 | Copper Tube JIS - CuPl (ASM - ETP) | 25 | | 20 | 2.6 | 46 | 2 | |

Figure 6:
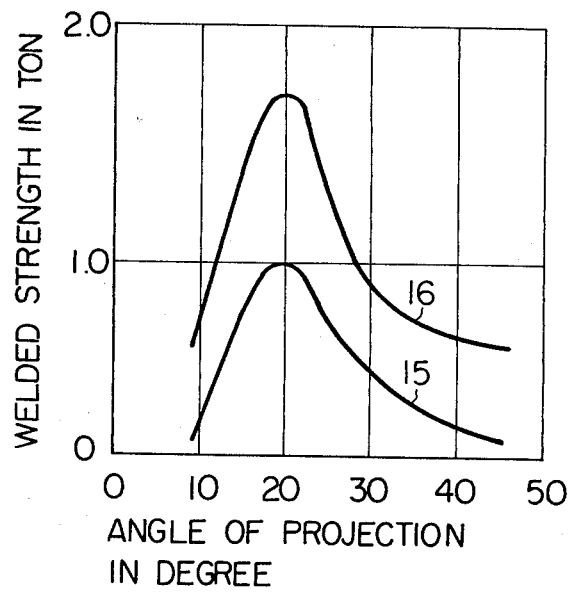
FIG. 6 illustrates the variations of weld strength with the angle of a projection formed on a steel member welded to an aluminum member at two different welding currents according to Example 1.

LEGEND
d - Diameter
h - Height
l - Length
i.d. - Inside diam. (mm)
o.d. - Outside diam. (mm)
w - Width
I - Welding current
P - Welding pressure
t - Welding time
- Angle The results are shown in FIG. 6 as a plot of total weld strength (in tons) versus angle of projection (in degrees) for current densities of approximately 1.5 KA/mm$^2$ (curve 15) and 1.7 KA/mm$^2$ (curve 16). It is apparent from FIG. 6 that weld strength reaches a maximum value at a projection angle of 20° for both current densities in the case of the two materials used for this Example. The weld strength decreases on either side of this maximum point but remains satisfactorily high through the range of projection angles between 12° and 30°.

The weld strength decreases most rapidly with decrease in the angle of projection α below 20°. This decrease in weld strength is believed to result from creation of a temperature profile in the projection in which the middle portion is heated to a higher temperature than the top portion, particularly as the angles of the sides of the projection become increasingly smaller than 20°. This temperature distribution tends to cause the projection to buckle at the middle portion so that the desired plastic flow of this portion will not occur. In that case the molten metal of the top portion will not be squeezed sufficiently away from the contact area to the edges of the weld joint, so that decreased strength results.

Figure 7:
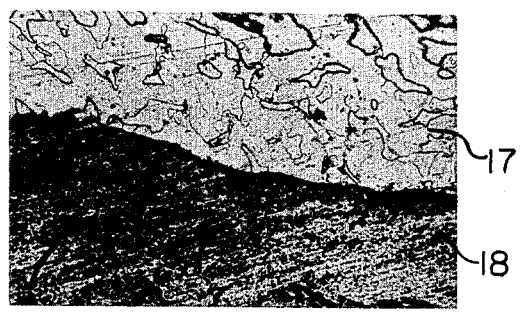
FIG. 7 shows the microscopic structure of the center portion of a welded junction between the steel and aluminum members of Example 1, at a magnification of 200X.
Figure 8:
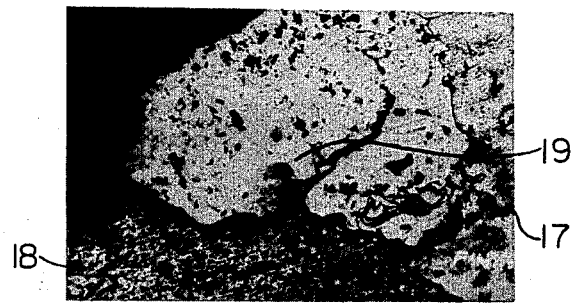
FIG. 8 shows the microscopic structure of the laterally extruded fin of melted metal at the edges of a welded joint made according to Example 1, at a magnification of 200X.

FIGS. 7 and 8 provide evidence that the squeezing of the molten metal of the top surface of the projection results in a transfer of intermetallic compounds to the boundaries of the weld.

FIG. 7 is a magnified section (200X) of the middle portion of the welded joint at the boundary between the steel projection and the aluminum plate. The steel is represented by numeral 17 and the aluminum by numeral 18. No intermetallic compounds can be found in this region.

FIG. 8 is a microphotograph (200X) taken at the edge of the welded joint in the extruded flash or fin. The photograph shows a portion 17 composed of steel, an adjacent portion 18 composed of aluminum, and a portion 19 squeezed out to the very edge of the fin that is composed primarily of intermetallic compounds. These two figures clearly support the conclusion, therefore, that the molten metal is squeezed along the boundary between the two materials to form the fin.

EXAMPLE 2

In this Example a steel disc, prepared with a projection as in Example 1, was also welded to an aluminum plate. Carbon steel was used for the first metallic article instead of the case hardened steel of Example 1, and a different type of aluminum was used for the second metallic article; however, the results of Examples 1 and 2 are essentially comparable because of the similarity of the first and the second metallic materials in each case.

Figure 9:
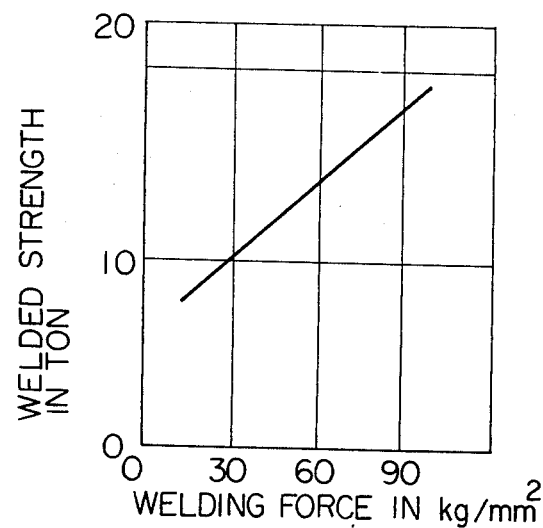
FIG. 9 illustrates the variation of weld strength with welding pressure for a projection formed on a steel member welded to an aluminum member according to Example 2.

As seen from Table 1, the tests of Example 2 were carried out over a range of welding pressures from 10 to 100 kg/mm$^2$, with all other welding parameters being held constant in the two examples. These results are plotted in FIG. 9 on a graph of weld strength (in tons) versus welding force (in kg/mm$^2$). The straight line of the graph shows that weld strength varies linearly with the force applied between the two metallic articles up to the point at which the projection will buckle or plastically deform without any application of welding current. This phenomenon indicates that optimum weld strength can be obtained between two workpieces by using a welding pressure slightly less than the pressure at which buckling of the projection will occur prior to heating by passage of an electric current.

Thus, an important aspect of the present invention is that the preferred welding pressure be as high as possible, within the physical strength limitations of the projection. This is just opposite to the situation in which articles made of the same metal are to be welded together by the same method. In that case, increased welding force will tend to lower the contact resistance so that the heat generated at the weld junction will not be sufficient to insure satisfactory melting of the metal.

The tests of Examples 1 and 2 show that for welds between a steel member having a projection approximately 2 mm high and with a top width of approximately 0.5 mm, satisfactory weld strength will be achieved with projection angles α in the range from 12° to 30°, with welding pressures ranging from 30 to 100 kg/mm$^2$, and with welding currents of at least 1.5 KA/mm$^2$. Additional tests of a similar nature further varying both welding current and welding time indicate an operable upper limit for current density of about 2.3 KA/mm$^2$ and a range for welding time of 0.5 to 10 cycles. Within these operable ranges, the preferred ranges for pressure and current are 48 to 83 kg/mm$^2$ and 1.8 to 2.3 KA/mm$^2$, respectively.

EXAMPLE 3

As shown in Table 1, a steel disc of the same composition as in Example 2, and equipped with a projection, was welded to a cast iron plate. In this Example, the welding time was varied for three different current densities while the other welding parameters were held constant. The results of the tests are shown in FIG. 10 in terms of weld strength (in tons) versus welding time (in cycles).

Figure 10:
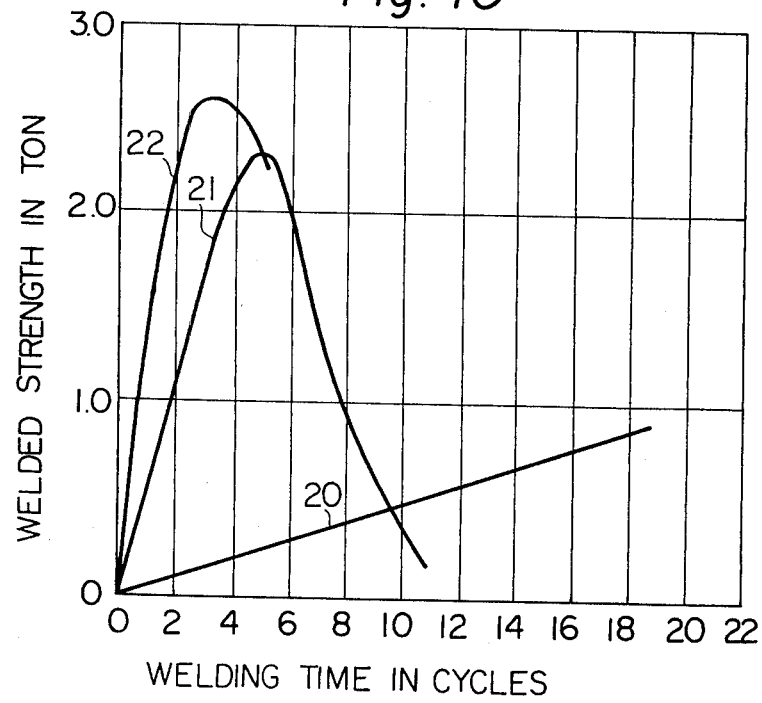
FIG. 10 illustrates the variations of weld strength with the welding time at three different welding currents for a projection on a steel member welded to a grey cast iron member according to Example 3.

The curves of FIG. 10 disclose a startling difference between the tests conducted at a welding current density of approximately 0.5 KA/mm$^2$ (curve 20) and tests conducted at current densities of approximately 0.8 KA/mm$^2$ (curve 21) and 1.1 KA/mm$^2$ (curve 22). In the series of tests at the lowest welding current of 0.5 KA/mm$^2$, weld strength increases linearly with increasing weld time, but the weld strength never reaches a minimum satisfactory value of about 1 ton within the range of the test.

On the other hand, the curves 22 and 23 for the tests at 0.8 and 1.1 KA/mm$^2$, respectively, show a dramatic increase in weld strength up to a maximum point about 2 tons at relatively low welding time and an equally rapid fall off as the welding times increase beyond that point. Additional tests of the same nature at still more values of welding current and welding times, as well as tests similar to those of Examples 1 and 2 have demonstrated that the operable ranges of parameters for resistance welding of an iron member having a small projection of the same size as the previous examples and a cast iron member are approximately 0.75 to 2 KA/mm$^2$, 15 to 90 kg/mm$^2$, and 0.5 cycles, for a range of projection angles of 12° to 35°. The preferred ranges for welding current and pressure are approximately 1.1 to 1.6 KA/mm$^2$ and 34 to 71 kg/mm$^2$, respectively.

EXAMPLE 4

Referring to Table 1, a first metallic article in the form of a copper disc with a projection, of the same dimensions as the first article of Example 2, was welded according to the method of the invention to one face of an aluminum disc, using a welding current of approximately 3.1 KA/mm$^2$, for 1 cycle and a welding pressure of approximately 35 kg/mm$^2$. A satisfactory weld strength of 0.8 ton was obtained.

From a series of additional tests, the operative ranges of parameters when welding a copper article with a projection approximately 2 mm high and 0.5 mm wide at the top to an aluminum article are 2.9 to 3.4 KA/mm$^2$ for 0.5 to 3 cycles at 20 to 50 kg/mm$^2$. The preferred ranges of welding current and welding pressure are 3.0 to 3.3 KA/mm$^2$ and 28 to 32 kg/mm$^2$, respectively, and the range of projection angles operable for these materials is 15° to 25°.

EXAMPLE 5

The test pieces of this Example were a carbon steel disc (as in Example 2) with a 2 mm by 0.5 mm projection and a commercially pure titanium disc. Using the parameters shown in Table 1, a weld strength of 4.5 ton was obtained.

Additional tests, similar to those previously described, established operative ranges for steel and titanium welded according to the method of the present invention of 1.4 to 2.0 KA/mm$^2$ for 0.5 to 3 cycles under pressures of 30 to 100 kg/mm$^2$, with projection dimensions of approximately 2 mm by 0.5 mm and angles of 7° to 25°. The preferred ranges of welding current and pressure are 1.6 to 1.8 KA/mm$^2$ and 48 to 83 kg/mm$^2$, respectively.

EXAMPLE 6

Here a steel disc with a projection, identical to that of Examples 2 and 5, was butt welded to the end of a copper tube by the method of the invention, using the welding parameter values given in Table 1. The resulting weld strength was 2.1 tons.

Additional tests similar to those previously described established operative ranges for a steel member with a small (2 mm×0.5 mm) projection welded to a copper member according to the method of the invention of 2.3 to 2.9 KA/mm$^2$ for 1 to 5 cycles at 20 to 80 kg/mm$^2$, with projection angles from 15° to 25°. The preferred ranges for current and pressure are 2.5 to 2.7 KA/mm$^2$ and 35 to 65 kg/mm$^2$, respectively.

The foregoing examples were all welded according to the previously-described method of the present invention in which melting of the projection occurs only in the top portion, the intermediate portion is plastically deformed, and the bottom portion remains unchanged.

Figure 11:
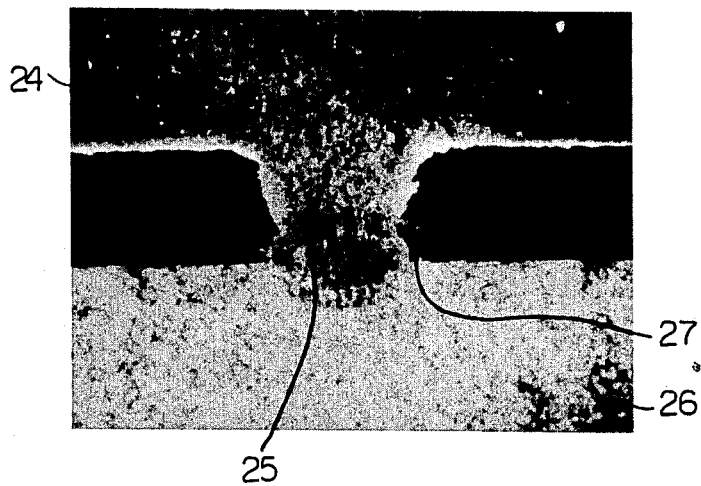
FIG. 11 shows the microscopic structure of a cross section of the welded junction between a projection formed on a steel member welded to a cast iron member according to Example 3, but with the welding current stopped before completion of the weld to illustrate the lateral squeezing of molten metal at the weld junction. Magnification is 6X.

FIG. 11 illustrates how the melted top portion of the projection is squeezed to the edges of the weld zone by plastic flow of the metal in the intermediate portion during the application of electric current and pressure. This figure is a microphotograph, at a magnification of 6X, of a cross section of one of the test welds using the steel and grey cast iron workpieces of Example 3. In this test the welding current density was approximately 1.1 KA/mm$^2$, and the welding time was 1 cycle at a welding pressure of 23 kg/mm$^2$.

As shown by curve 22 of FIG. 10, the optimum welding time for a current density of 1.1 Ka/mm$^2$ is between 2 and 3 cycles. Stopping the welding current after 1 cycle permits the various portions of the welding zone to be clearly seen.

In FIG. 11, a steel workpiece 24 with an integrally formed trapezoidal projection 25 has been butt-welded to a cast iron workpiece 26. The extruded portions 27 on each side of the juncture between the steel projection and the cast iron member constitute metal that has melted and resolidified. This metal was originally the top portion of the projection and the abutting surface portion of the second workpiece. During the application of the welding current it melted, and under the influence of the welding pressure it was squeezed laterally to the edges of the weld zone by plastic flow of the adjacent intermediate portion of the projection. Consequently, unmelted, atmospherically unexposed, plastically flowable metals of the first and second workpieces form an intimate bond across the entire contact zone, without the inclusion of any oxides, surface foreign matter, or intermetallic compounds in the welded joint.

In the test piece of FIG. 11, the remaining undeformed base portion of the projection is a relatively large part of the original projection, because of the short welding time used. A longer welding time would cause a greater part of the total projection to be melted or rendered plastically flowable. It is an essential upper limitation to welding time, however, that there always remain an identifiable base portion of the projection that has remained undeformed, without any evidence of having plastically flowed.

To recapitulate, therefore, the method of the present invention combines formation of a small projection or projections of trapezoidal cross section on the surface of one of the two dissimilar metals and resistance welding of the projection to the other of the two metals. Preferably, the projection is formed on the metal more difficult to melt by the passage of electric current. The height, top width and side angles of the projection are defined to produce a continuously decreasing temperature profile in the projection, from top to base, upon the passage of electric current through the two metals across their boundary.

The minimum combination of welding current and welding time is that which will just cause melting to occur at the contact surfaces. The maximum combination of current and time is that which still will leave an identifiable undeformed base portion of the projection after welding is completed.

The minimum welding pressure is that which will provide the necessary minimum weld strength. The maximum welding pressure is that which will not buckle or deform the projection prior to passage of welding current through the projection.

What we claim is:

1. A method for resistance welding two members made of dissimilar metals that includes the steps of placing a surface of a first member made of one metallic material into electrically conductive contact with a surface of a second member made of another metallic material different from the first material, passing an electrical welding current across the contact area between the two members for a time sufficient to render plastic a portion of the metallic material of one of the members, and pressing the first and second members together with sufficient force to squeeze any surface impurities and intermetallic compounds to the edges of the contact area, wherein the improvement comprises:

forming at least one small, integral, tapered, flat-topped projection of trapezoidal cross section on the first member, the projection having a predetermined height, divided into a top portion, an intermediate portion and a base portion, and a predetermined width of the flat-topped surface, and opposite sides of the tapered projection each making a predetermined angle with a line perpendicular to the flat-topped surface such that passage of a welding current through the projection will generate a temperature distribution that decreases continuously from the top portion to the base portion, and further, that the projection radially spreads in a plastic flow;

pressing the top surface of the at least one projection of the first member against the surface of the second member with a high welding pressure selected to be approximately in the range of 15–100 kg/mm² of top surface area of the projection, but which does not exceed a force that will deform the projection prior to the application of welding current, and;

passing a predetermined high welding current density approximately in the range of 0.75 to 3.4 KA/mm² to top surface area of the projection for a short time period approximately in the range of 0.5 to 10 cycles at 60 Hz, such that the contacting surfaces of the two members are melted, said intermediate portion of the projection flows plastically under said welding pressure and the base portion of the projection does not plastically flow, and due to said plastic flow, obtaining welded surfaces having no intermetallic compound of said dissimilar metals remaining at said welded surfaces.

2. The method of claim 1 wherein the metallic material of the first member is the more difficult of the two metallic materials to melt by passage of an electric current therethrough.

3. The method of claim 1 wherein the predetermined height of the projection is about two millimeters, and the predetermined width of the top surface of the projection is about one-half millimeter.

4. The method of claim 1 wherein the projection has a predetermined height of approximately 2 mm, a predetermined to width of approximately 0.5 mm, and a predetermined side angle of between approximately 7 to approximately 35 degrees.

5. The method of claim 4 wherein the predetermined welding current density is approximately in the range of 1.10 to 3.3 KA/mm² of top surface area of the projection; and the predetermined welding pressure is approximately in the range of 28 to 83 kg/mm² of top surface area of the projection.

6. The method of claim 1 wherein the one metallic material of the first member is steel, and the other metallic material of the second member is aluminum.

7. The method of claim 6 wherein said predetermined side angle of the projection is approximately 12 degrees to 30 degrees.

8. The method of claim 7, wherein said predetermined height and width of the projection are approximately 2 mm and 0.5 mm, respectively.

9. The method of claim 6 wherein the projection has a predetermined height of approximately 2 mm, a predetermined top width of approximately 0.5 mm, and a predetermined side angle of approximately 12 to 30 degrees; the predetermined welding current density is approximately in the range of 1.5 to 2.6 KA/mm² of top surface area of the projection; and the predetermined welding pressure is approximately in the range of 30 to 100 kg/mm² of top surface area of the projection.

10. The method of claim 9, wherein said welding current density is in the range from 1.8 to 2.3 KA/mm², and said welding pressure is in the range from 48 to 83 kg/mm².

11. The method of claim 1 wherein the one metallic material of the first member is steel, and the other metallic material of the second member is cast iron.

12. The method of claim 11 wherein said predetermined side angle of the projection is approximately 12 degrees to 35 degrees.

13. The method of claim 12 wherein said predetermined height and width of the projection are approximately 2 mm and 0.5 mm, respectively.

14. The method of claim 11 wherein the projection has a predetermined height of approximately 2 mm, a predetermined top width of approximately 0.5 mm, and a predetermined side angle of approximately 12 to 35 degrees; the predetermined welding current density is approximately in the range of 0.75 to 2 KA/mm² of top surface area of the projection; and the predetermined welding pressure is approximately in the range of 15 to 90 kg/mm² of top surface area of the projection.

15. The method of claim 14 wherein said welding current density is in the range from 1.1 to 1.7 KA/mm², and said welding pressure is in the range from 34 to 71 kg/mm².

16. The method of claim 1 wherein the one metallic material of the first member is copper, and the other metallic material of the second member is aluminum.

17. The method of claim 16 wherein said predetermined side angle of the projection is approximately 12 degrees to 30 degrees.

18. The method of claim 17 wherein said predetermined height and width of the projection are approximately 2 mm and 0.5 mm, respectively.

19. The method of claim 16 wherein the projection has a predetermined height of approximately 2 mm, a predetermined top width of approximately 0.5 mm, and a predetermined side angle of approximately 12 to 30 degrees; the predetermined welding current density is approximately in the range of 2.9 to 3.4 KA/mm² of top surface area of the projection; the predetermined welding pressure is approximately in the range of 20 to 50 kg/mm² of top surface area of the projection; and the predetermined welding time is in the range of approximately 0.5 to 3 cycles at 60 Hz.

20. The method of claim 19 wherein said welding current is in the range from 3.0 to 3.3 KA/mm², and said welding pressure is in the range from 28 to 32 kg/mm².

21. The method of claim 1 wherein the one metallic material of the first member is steel, and the other metallic material of the second member is copper.

22. The method of claim 21 wherein said predetermined side angle of the projection is approximately 15 degrees to 25 degrees.

23. The method of claim 22 wherein said predetermined height and width of the projection are approximately 2 mm and 0.5 mm, respectively.

24. The method of claim 21 wherein the projection has a predetermined height of approximately 2 mm, a predetermined top width of approximately 0.5 mm, and a predetermined side angle of approximately 15 to 25 degrees; the predetermined welding current density is approximately in the range of 2.3 to 2.9 KA/mm² of top surface area of the projection; the predetermined welding pressure is approximately in the range of 20 to 80 kg/mm² of top surface area of the projection; and the predetermined welding time is in the range of approximately 1 to 5 cycles at 60 Hz.

25. The method of claim 24 wherein said welding current is in the range from 2.5 to 2.7 KA/mm², and said welding pressure is in the range from 35 to 65 kg/mm².

26. The method of claim 1 wherein the one metallic material of the first member is steel, and the other metallic material of the second member is titanium.

27. The method of claim 26 wherein said predetermined angle of the projection is approximately 7 degrees to 25 degrees.

28. The method of claim 27 wherein said predetermined height and width of the projection are approximately 2 mm and 0.5 mm, respectively.

29. The method of claim 26 wherein the projection has a predetermined height of approximately 2 mm, a predetermined top width of approximately 0.5 mm, and a predetermined side angle of approximately 7 to 25 degrees; the predetermined welding current density is approximately in the range of 1.4 to 2.0 KA/mm$^2$ of top surface area of the projection; the predetermined welding pressure is approximately in the range of 30 to 100 kg/mm$^2$ of top surface area of the projection; and the predetermined welding time is in the range of approximately 0.5 to 3 cycles at 60 Hz.

30. The method of claim 29 wherein said welding current is in the range from 1.6 to 1.8 KA/mm$^2$, and said welding pressure is in the range from 48 to 83 kg/mm$^2$.

* * * * *

UNITED STATES PATENT AND TRADEMARK OFFICE
CERTIFICATE OF CORRECTION

PATENT NO. : 4,273,983
DATED : June 16, 1981
INVENTOR(S) : Masahiro Ogawa and Tugio Mizobe It is certified that error appears in the above—identified patent and that said Letters Patent is hereby corrected as shown below:

Col. 1, lines 43-44 and Col. 2, line 19, correct spelling of "fusion".

In Table 1, Example 3, under heading "Kind of Material and Shape", before "ASTM" insert -- ( --.

Col. 15, line 7, change "to" to --of--.

Col. 15, line 27, after "predetermined" delete "to".

Signed and Sealed this

Twenty-second Day of September 1981

[SEAL]

Attest:

GERALD J. MOSSINGHOFF

Attesting Officer

Commissioner of Patents and Trademarks